(12) United States Patent
Harris et al.

(10) Patent No.: US 12,194,615 B1
(45) Date of Patent: Jan. 14, 2025

(54) SURFACE REMOVAL SYSTEM

(71) Applicant: The United States of America as represented by the Secretary of the Navy, Arlington, VA (US)

(72) Inventors: Logan Harris, Silverdale, WA (US); Eric Meeks, Seabeck, WA (US); Alexander Read, Bremerton, WA (US)

(73) Assignee: The United States of America as represented by the Secretary of the U.S. Navy, Keyport, WA (US)

( * ) Notice: Subject to any disclaimer, the term of this patent is extended or adjusted under 35 U.S.C. 154(b) by 819 days.

(21) Appl. No.: 17/300,010

(22) Filed: Feb. 5, 2021

Related U.S. Application Data

(60) Provisional application No. 62/918,724, filed on Feb. 10, 2020.

(51) Int. Cl.
*B25J 11/00* (2006.01)
*B25J 13/06* (2006.01)
*B25J 17/02* (2006.01)

(52) U.S. Cl.
CPC ........... *B25J 11/0055* (2013.01); *B25J 13/06* (2013.01); *B25J 17/0258* (2013.01)

(58) Field of Classification Search
CPC . B08B 1/00; B08B 1/005; A47L 13/00; A47L 13/02; A47L 13/022; A47L 13/03; A47L 13/08; A47L 13/26; E02F 3/3604; E02F 3/609; E02F 3/677; E02F 3/369; E02F 3/96; E02F 5/027; E02F 5/102; E02F 5/103; E02F 5/106; E04G 23/08; E04G 23/081; E04G 23/082; E04G 23/0296;
(Continued)

(56) References Cited

U.S. PATENT DOCUMENTS 5,267,824 A * 12/1993 Kishi ............... E02F 3/306
 414/718
2009/0126542 A1 * 5/2009 Nonaka ............ B26D 7/2614
 83/43

(Continued)

FOREIGN PATENT DOCUMENTS

CN     1812868 A  *  8/2006  ............ B25J 13/08
WO  WO-2018055189 A1 *  3/2018  ......... B24B 27/0038

OTHER PUBLICATIONS

CN-1812868 Machine Translation (Year: 2006).*
WO2018055189—Machine Translation (Year: 2018).*

*Primary Examiner* — Brian D Keller
*Assistant Examiner* — Alberto Saenz
(74) *Attorney, Agent, or Firm* — Stephen J. Leahu; Naval Undersea Warfare Center, Keyport

(57) ABSTRACT

A hydraulically operated tool adapted to remove coatings and surfaces from a substrate. The tool may comprise a robotic machine that includes a surface removal tool, a manipulator arm, and a rotation assembly. The manipulator arm may position the surface removal tool to a location along the substrate. The rotation assembly may adjust an angular position of the surface removal tool. A first end of the manipulator arm may be coupled to the surface removal tool, and a second end of the manipulator arm may be coupled to the rotation assembly. The manipulator arm may be hydraulically extended and retracted. The rotation assembly may comprise a spindle, and may be attached to a hinge pin and an air bladder.

15 Claims, 15 Drawing Sheets

(58) Field of Classification Search
CPC .... B25J 11/0055; B25J 13/06; B25J 17/0258; B25J 11/005; B25J 11/006; B23D 17/00; B23D 35/00; B23D 35/001; B23D 35/002; F16H 25/20; F16H 2025/2043; A01B 59/062; E01H 5/061; E04F 21/242
USPC ......... 30/134, 169, 170, 171, 172, 228, 379; 37/367; 299/36.1, 37.1; 15/93.1; 74/89.23, 89.25, 383, 519, 522.5
See application file for complete search history.

(56) References Cited

U.S. PATENT DOCUMENTS

2012/0003089 A1\* 1/2012 Byreddy ................. F03D 80/55
　　　　　　　　　　　　　　　　　　　　　416/61
2018/0283019 A1\* 10/2018 Telleria ................... B24B 55/06

\* cited by examiner

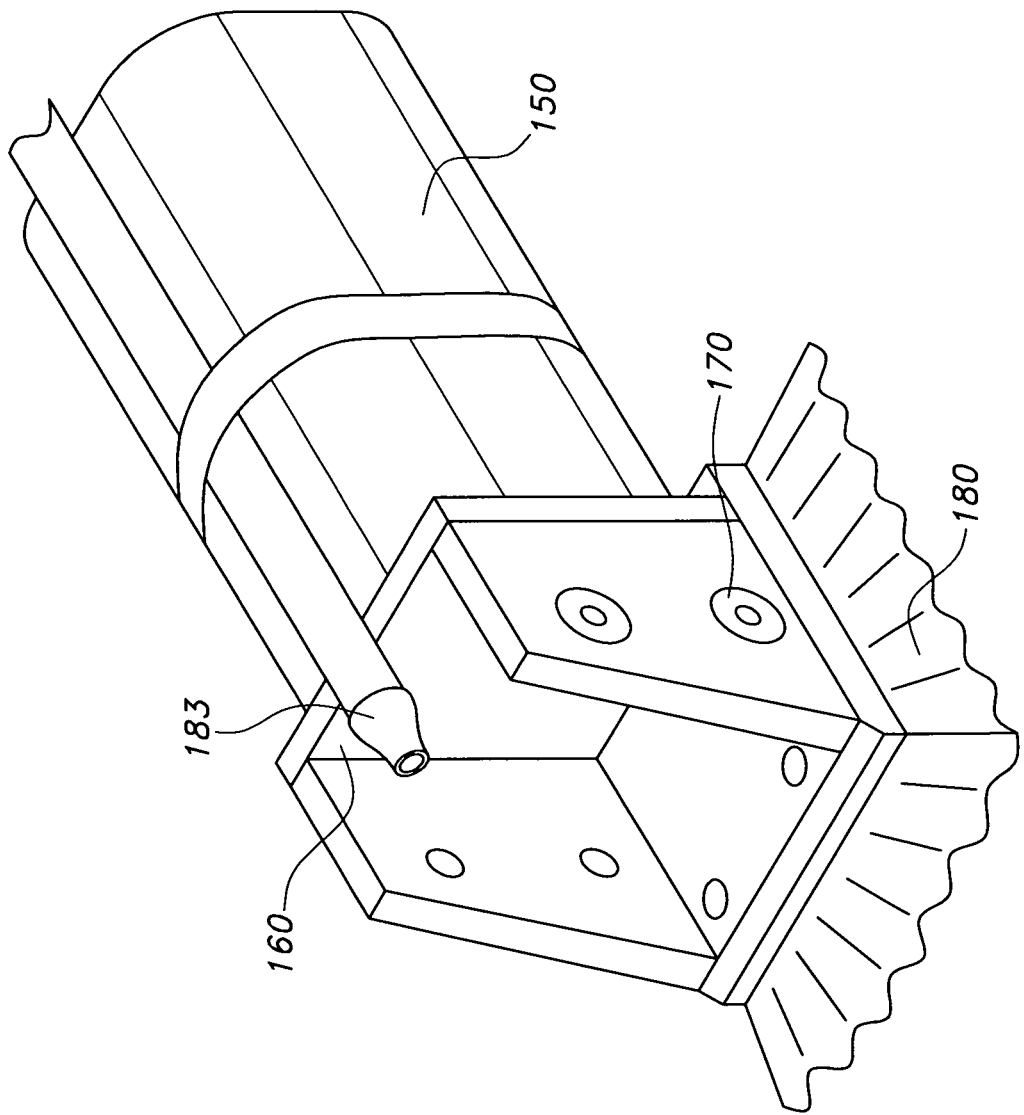

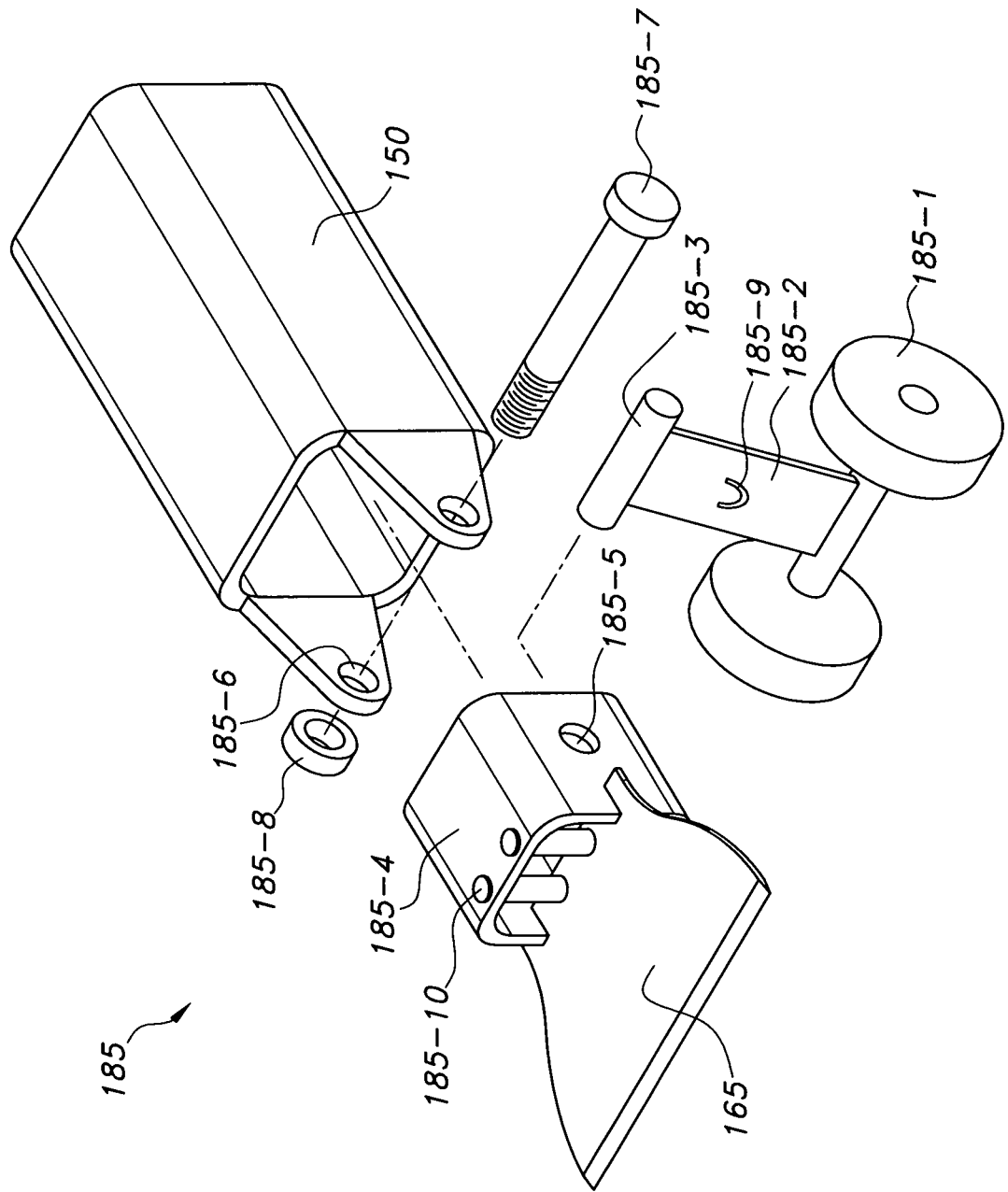

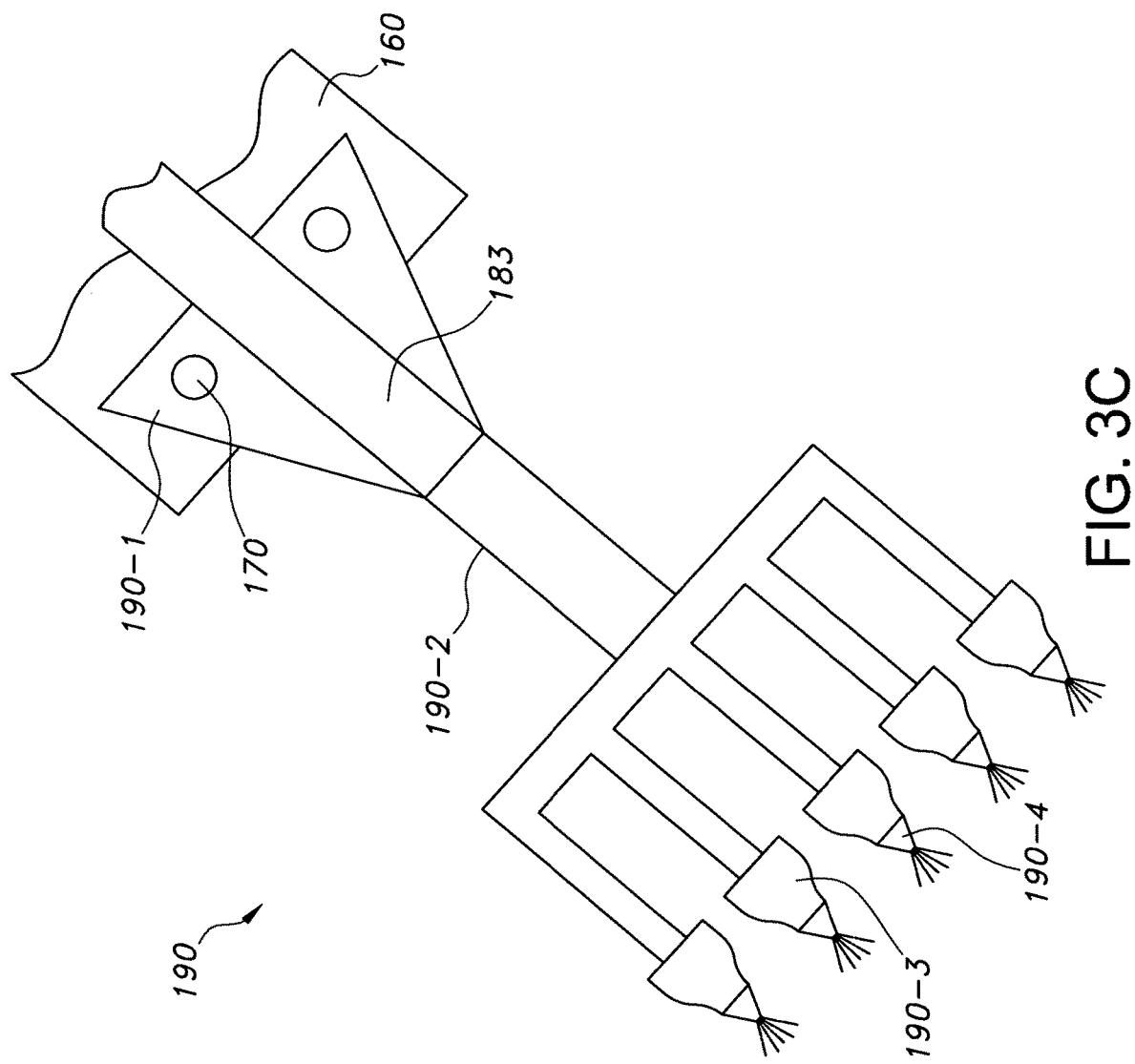

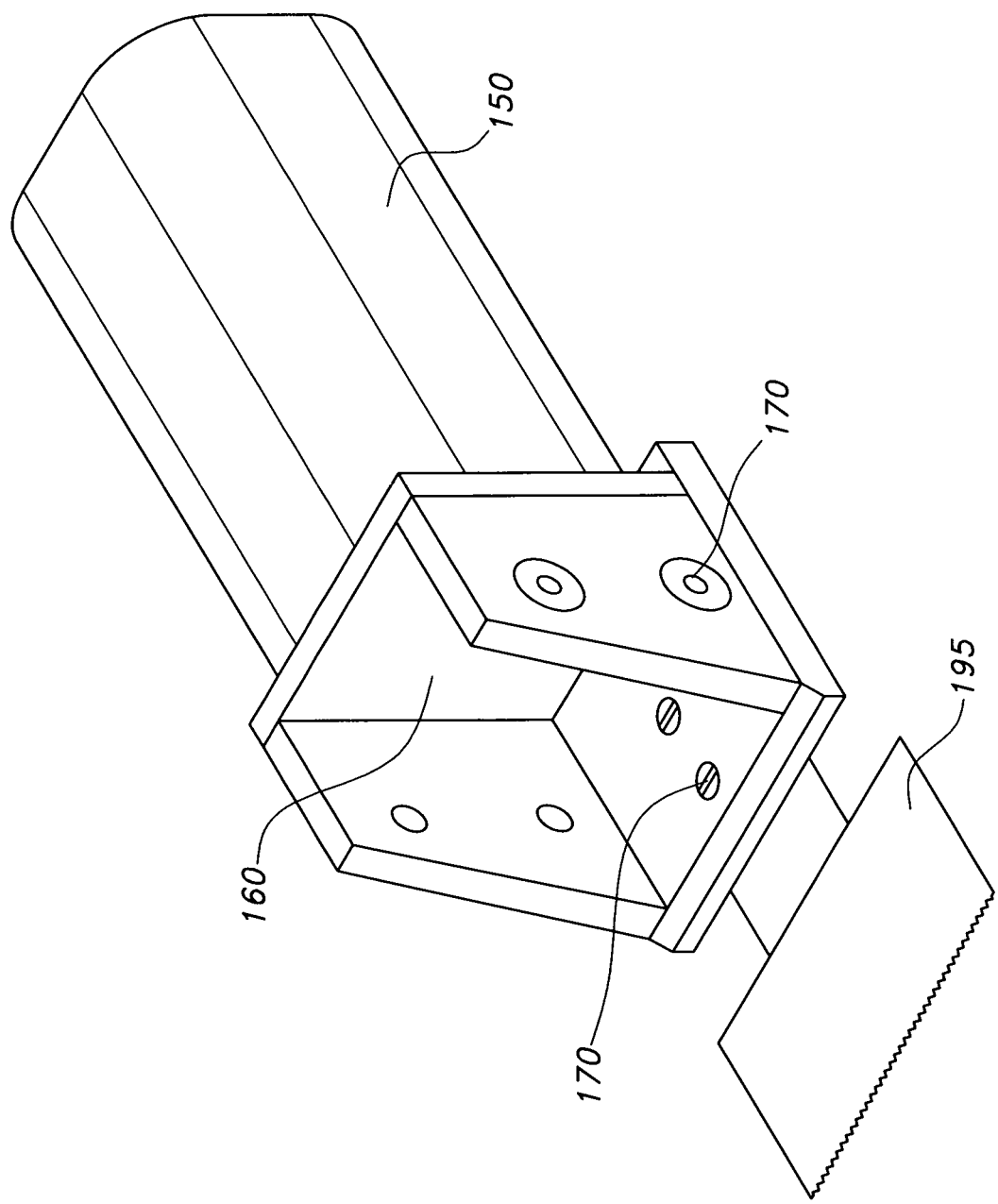

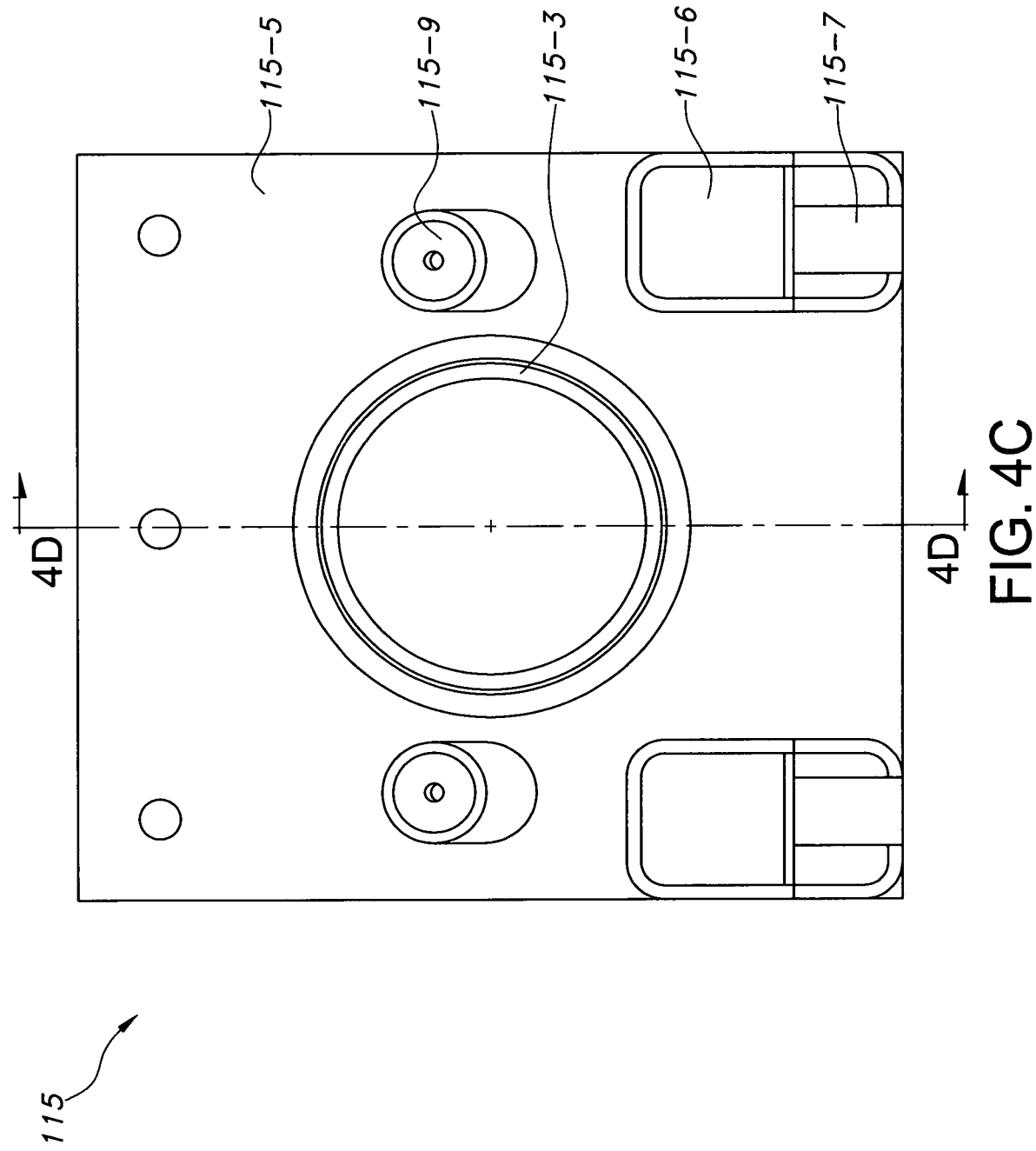

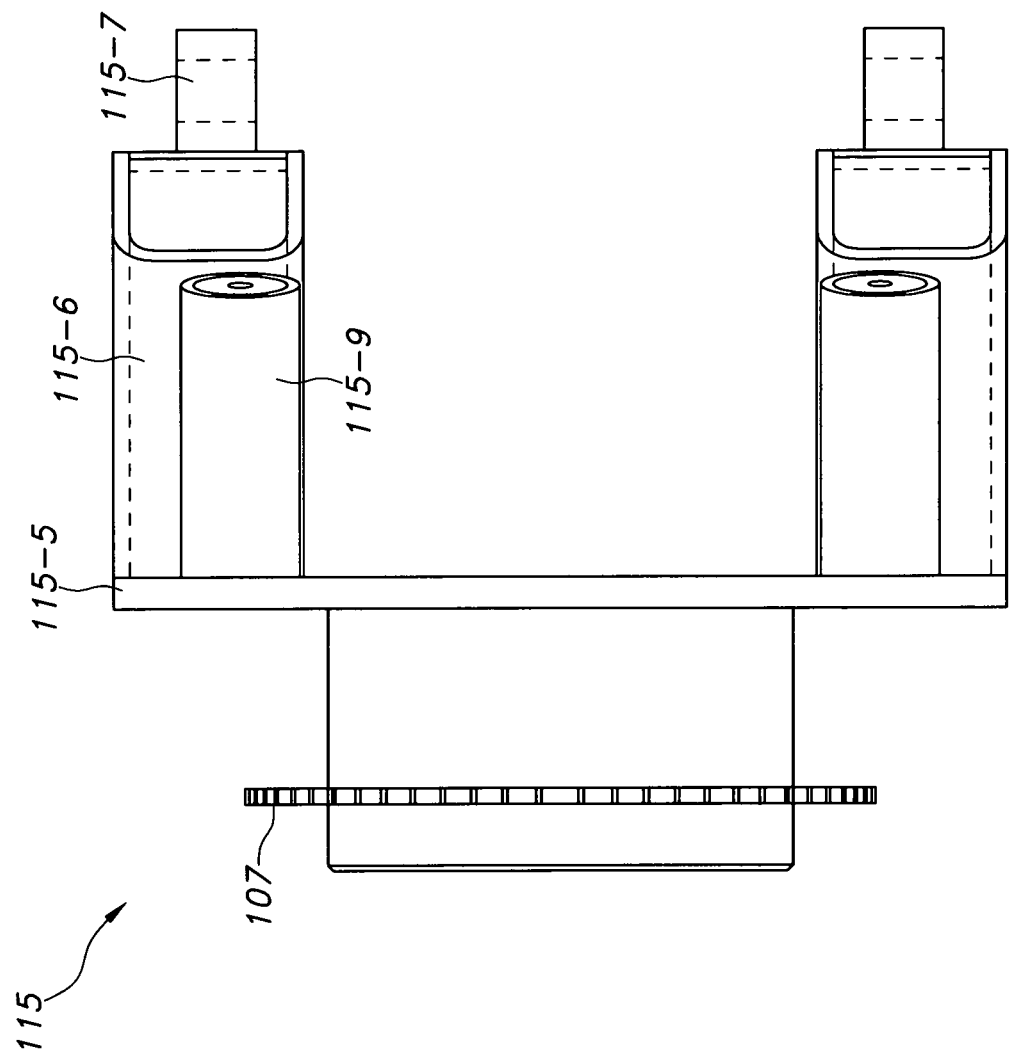

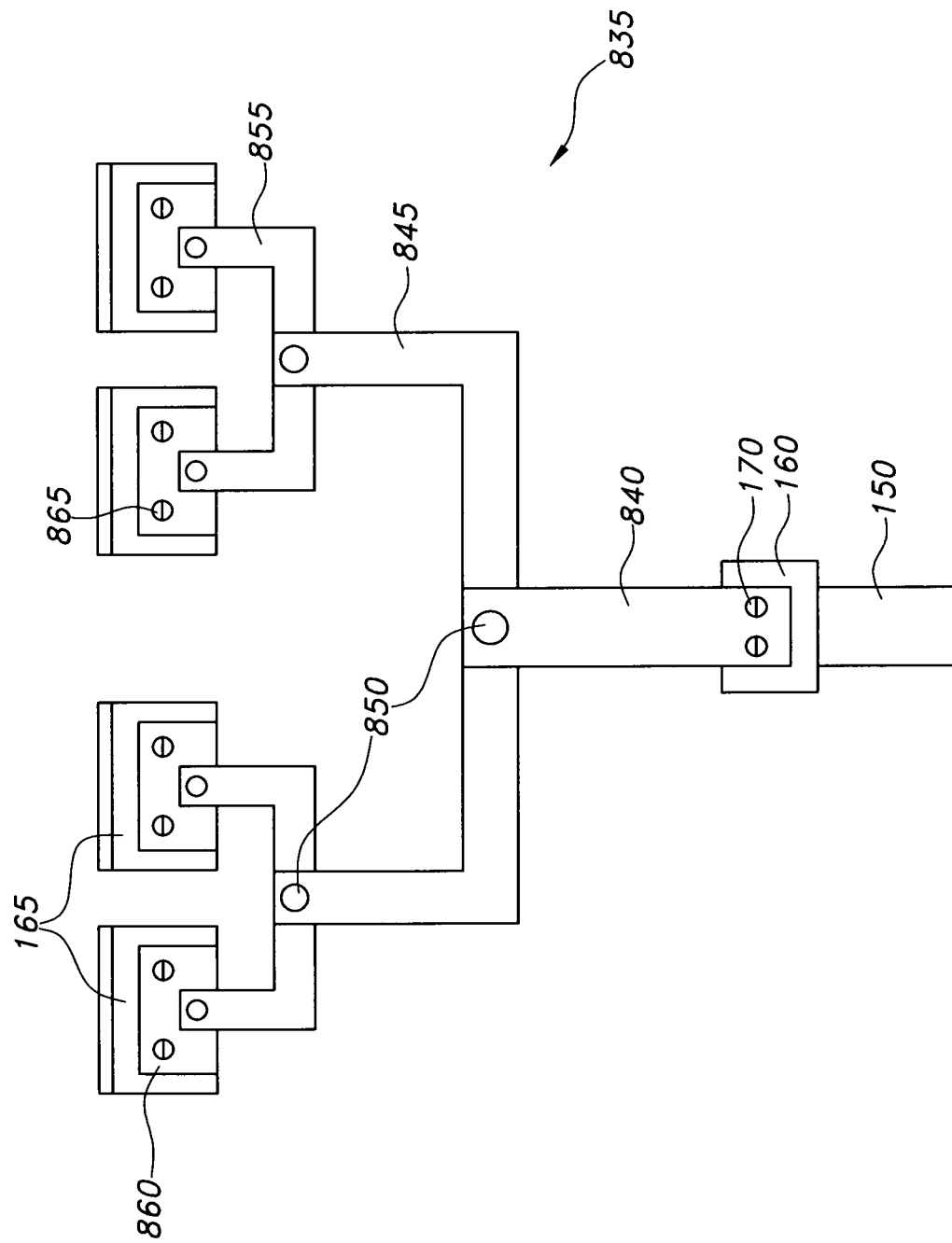

SURFACE REMOVAL SYSTEM

CROSS REFERENCE TO OTHER PATENT APPLICATIONS

The present application claims the benefit of U.S. provisional patent application 62/918,724 filed Feb. 10, 2020 and titled: Surface Removal System and Method, the complete disclosure of which is incorporated herein by reference.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

To mechanically remove layers of material from predominantly vertical substrates, very limited solutions exist. At many locations, such as shipyards and industrial facilities, this operation is performed by using handheld power tools to remove the material, such as for example, epoxy, from a substrate. One operator will "fillet" the layer as close as possible to the substrate while another operator pulls the layer away by hand or by use of ropes and clamps. This method is extremely unwieldy when performed above chest height. When performed in any capacity for long periods of time, this method causes chronic injuries, such as carpal tunnel and a similar syndrome in the shoulders. In severe cases these injuries can lead to the medical retirement of the worker.

These manual methods are also frequently performed many stories above the ground or at elevation when the surface under repair is large. Such operatives require full protection, safety training, and other operational risk mitigations to protect workers and avoid severe injury or death. These protections, while necessary, are costly to implement. This method is also slow and generally less efficient than desired, requiring many labor hours and consuming many resources in the process.

Other methods exist for removing surface layers, however these methods involve burning, chemically altering, or otherwise directing energy to denature the undesired layers. These methods generate hazardous smokes, slurries, airborne dust, or other non-solid contaminants. Safely implementing these chemical removal technologies requires environmental permitting, worker safety analysis, and issuance of appropriate personal protective equipment to workers. Such operational protections are also costly to implement and if improperly executed can also result in worker injuries.

Time spent by workers on the job may be restricted to limit exposure to these hazards. These restrictions on the amount of time work can be performed by an individual worker may cause an additional shift of workers to be added to the job. Thus, labor costs to complete the removal task on a given schedule are greater than those required on other tasks. Optionally, the schedule required to remove the material is lengthened since work can only be conducted for a fraction of the time available in a typical work week.

SUMMARY OF THE INVENTION

The present invention includes recognition of the problems and disadvantages of prior art methods and devices. The invention, surface removal system and method of the invention, provides significant improvements over existing techniques. According to one aspect of the invention, an operator performs the layer removal without use of a manual tool, eliminating common injuries associated with this work.

According to one aspect of the invention, an operator uses a hydraulically controlled arm to remove adhered layers of material from durable substrates of virtually any size or shape, including vertically tall and overhead structures. The invention thus does not require use of scaffolding, fall protection or other complex safety requirements normally required when workers work overhead.

According to another aspect of the invention, an operator can also perform this job more efficiently than using, for example, an excavator mounted fixed blade, because the invention maintains alignment of a blade over a large sweep of surface, allowing the operator to process an area with few readjustments of the main machine. This facilitated alignment and subsequent consistent cutting pressure according to an embodiment of the invention allows the blade to cut cleanly and remain very close to the durable substrate, eliminating undesirable remnants. This aspect of the invention also facilitates removal of material from surfaces with complex shapes including curved and compound curved surfaces.

According to yet another aspect of the invention, the mechanical scraping nature of this system does not generate noticeable dust or other hazards when used with most substrates. The invention is therefore more suitable than prior art techniques for removing hazardous materials and mitigating environmental impacts. The mechanical nature of the invention additionally avoids the use of harsh chemical removal methods and the attendant environmental and safety hazards associated with such methods.

Further advantages and features of the present invention will be described in detail below.

BRIEF DESCRIPTION OF THE DRAWINGS

FIGS. 3A-D are detailed illustrations of various attachments for surface removal tools according to embodiments of the invention;

FIGS. 4A-E are detailed illustrations of a rotator assembly according to an embodiment of the invention;

FIG. 8 shows a pivoting segmented blade according to an embodiment of the invention.

Like reference numerals refer to similar elements or features throughout the drawings.

DESCRIPTION OF EXEMPLARY EMBODIMENTS OF THE INVENTION

Figure 1:
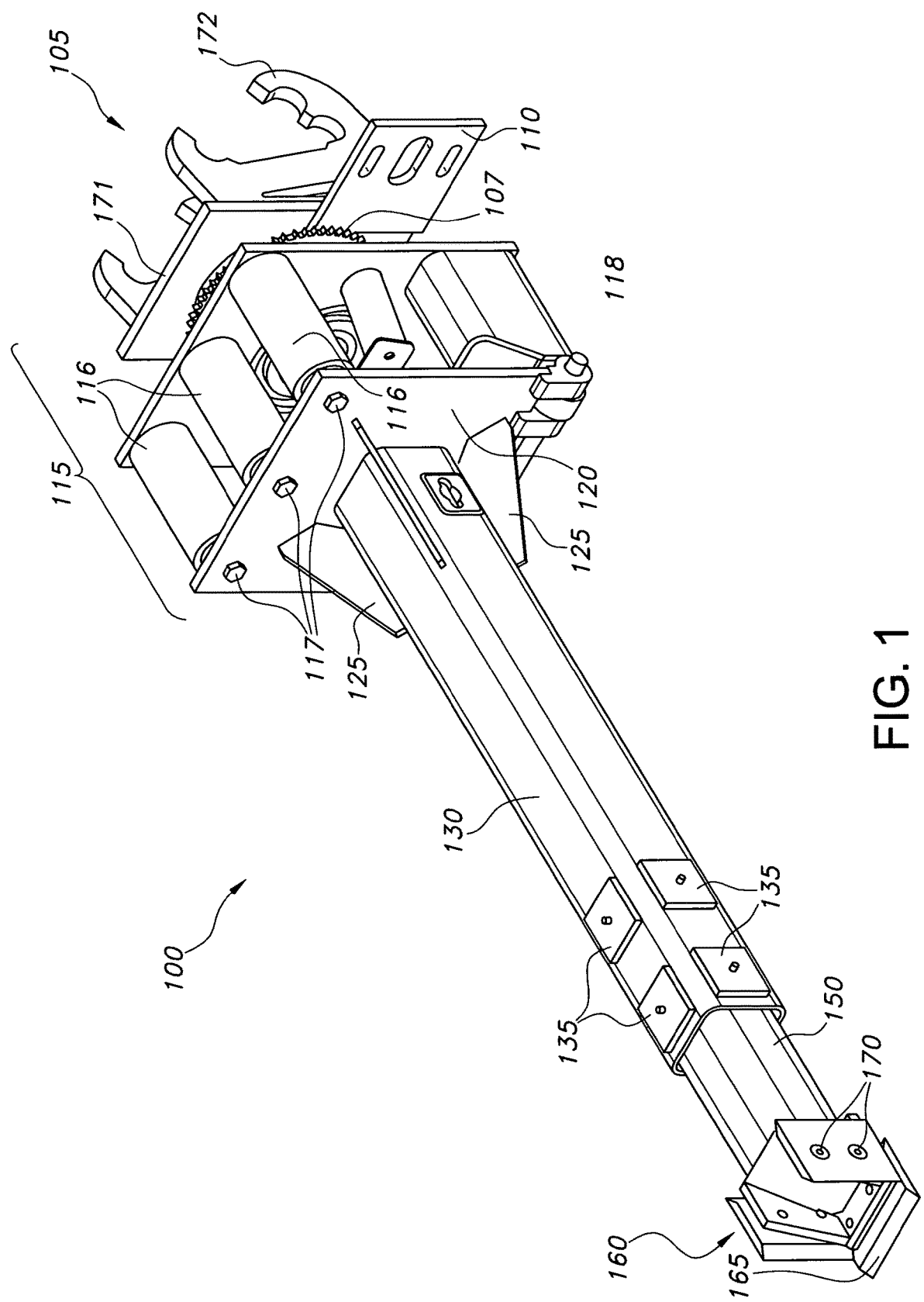
FIG. 1 is an illustration of a surface removal system according to an embodiment of the invention.
Figure 2:
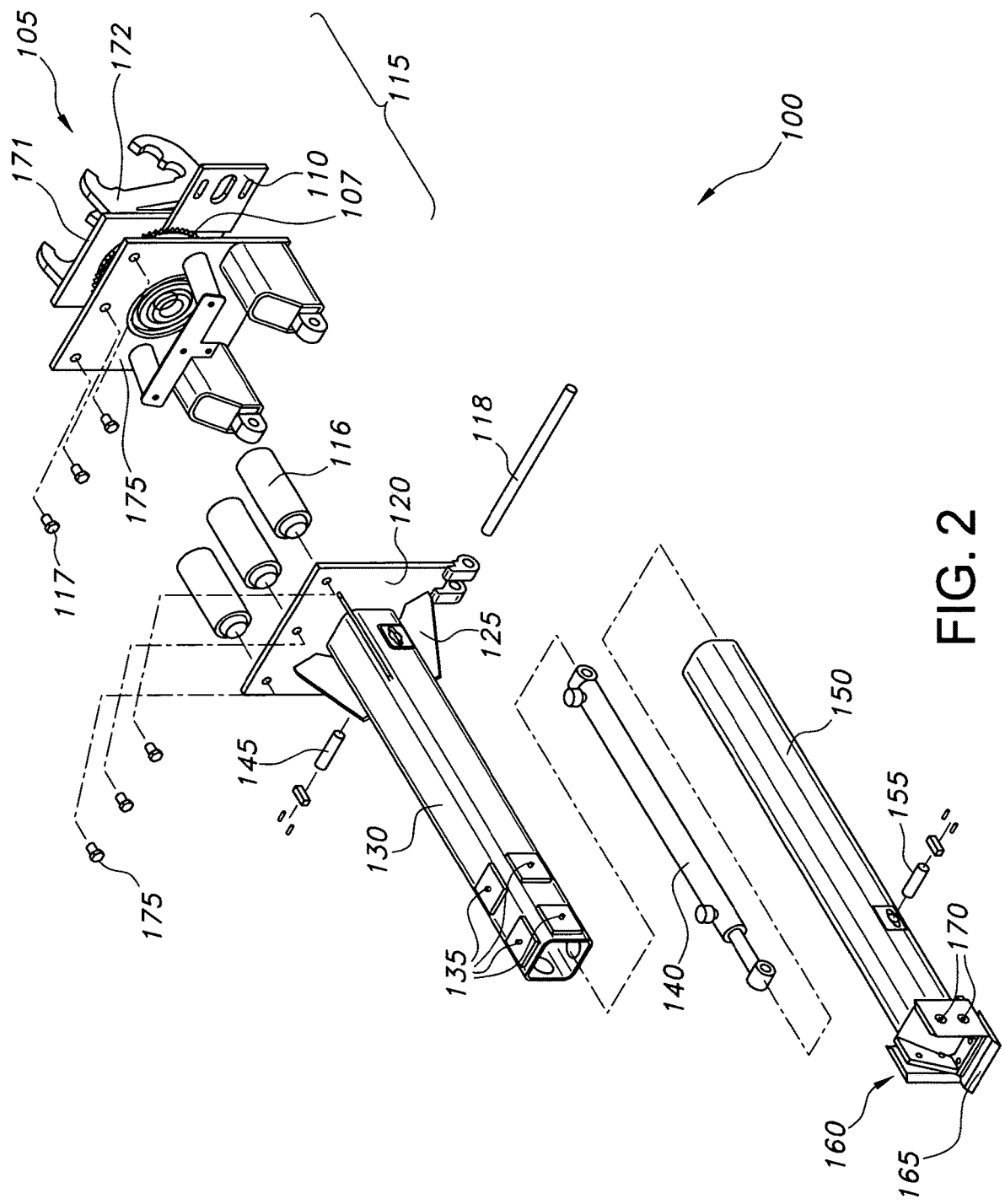
FIG. 2 is an exploded view of a surface removal system according to an embodiment of the invention.

FIG. 1 shows a surface removal system 100 fully assembled, while FIG. 2 shows an exploded view of surface removal system 100. As shown in FIGS. 1 and 2 surface removal system 100 comprises an arm mount 105, a spindle and gear assembly 107, a hydraulic drive mount 110, a rotator assembly 115, a plurality of air bladders 116, several bladder bolts 117, a hinge pin 118, a base tube baseplate 120, a base tube brace 125, a base tube 130, a plurality of bushings 135, a dual acting hydraulic cylinder 140, a base tube hydraulic pin 145, a telescoping shaft 150, a telescoping shaft hydraulic pin 155, a tool head 160, one or more blades, or tools 165, and several tool head bolts 170.

Arm mount 105 allows assembly 100 to be coupled to heavy machinery. According to one possible embodiment of the invention, arm mount 105 comprises a plate 171 and universal attachment 172. Both parts 171 and 172 maybe obtained from a manufacturer of heavy machinery, such as, for example, Brokk or Kubota. Arm mount 105 is typically universal to a specific manufacturer, meaning surface assembly 100, when attached to arm mount 105, may be used on any machine produced by a specific manufacturer. To use surface removal assembly 100 on a second manufacturer's machines, a second universal arm mount 105, specific to that second manufacturer, can be used.

In the embodiment of the invention as drawn in FIGS. 1 and 2, a rotator assembly 115 for rotating the arm assembly and the tool attached at the end of the arm is coupled to arm mount 105. Rotator assembly 115 includes spindle and gear assembly 107. A hydraulic drive mount 110 is also included for attaching a hydraulic motor (not shown) to arm mount 105. According to one possible embodiment drive mount 110 is welded to arm mount 105. Spindle and gear assembly 107 is coupled to a plate in rotator assembly 115 as is shown in FIG. 2.

Rotator assembly 115 further couples to base plate 120 at air bladders 116 and hinge pin 118 via a plurality of bladder bolts 117. Hinge pin 118 threads through several aligned holes, in much the same manner as the pin for a door hinge.

Base tube brace 125 supports base tube 130 and provides additional strength to the fasteners and weld joints on base plate 120 when the invention is in operation. According to one possible embodiment of the invention, base tube 130 is welded to base plate 120. Located within base tube 130 are bushings 135. Bushings 135 are made of a ductile or deformable material, such as for example plastic, to aid in free movement of base tube 130.

Dual acting hydraulic cylinder 140 is secured within base tube 130 at the base by base tube hydraulic pin 145; and within telescoping shaft 150 at the top by telescoping shaft hydraulic pin 155. A dual acting hydraulic cylinder, also known as a double acting hydraulic cylinder, is one where hydraulic pressure from fluid is used to both extend and retract the piston of the cylinder, or when high pressures are required for extension and retraction. A dual acting design differs from a single acting cylinder that employs the weight of the cylinder for retraction. When assembled, dual action hydraulic cylinder 140 rests inside telescoping shaft 150, which rests inside base tube 130. Hydraulic lines are run through the center of rotator assembly 115 and base tube 130 to dual acting hydraulic cylinder 140.

At the end of telescoping shaft 150 is tool head 160. According to one possible embodiment, tool head 160 secures to shaft 150 via a welded joint. Tool head 160 provides an interface for attaching various tools to the end of telescoping shaft 150. A chain secured to each chain loop 175 limits the motion of tool head 160; and in a preferred embodiment limits rotational motion to no further than approximately 24 degrees, preventing damage being done to both the invention and a surface when the invention is in operation.

Various types of tools may be attached to tool head 160. In the embodiment of the invention drawn in FIGS. 1 and 2, the tool comprises blades 165, attached to tool head 160 by tool head bolts 170. Blades 165 facilitate the removal of surface material by scraping the upper layer(s) from the underlying substrate. More specifically, blades 165 held and leveraged against the substrata and pushed forward, scraping the surface material from the substrate.

Other possible types of tools and attachments are illustrated in FIGS. 3A-3D. In the embodiment of FIG. 3A the tool comprises a cleaning brush 180 coupled to tool head 160. As telescoping shaft 150 is extended, cleaning brush 180 moves across a surface. Air bladders 116 assist in providing downward pressure on cleaning brush 180 so that matter particulates are removed.

An optional cleaning solution may also be stored and applied to the surface via additional or similarly constructed bladders 116. Cleaning solutions may be comprised of several alternatives as known to those of skill in the art. For example, the cleaning solution may be as simple as water or soap.

In another possible embodiment of the invention, the invention additionally includes one or more hose(s) 183 coupled to telescoping shaft 150. The cleaning solution, air, or other fluid, may be sprayed from hose 183. Although shown in use with the tool of FIG. 3A, hose 183 may be used with any tool or embodiment of the invention when use of a liquid solution is desired.

In the embodiment, of FIG. 3B, the tool comprises a roller pressure blade 185 useful for removing surface material from curved surfaces. Roller pressure blade 185 comprises a plurality of wheels 185-1, a wheel brace 185-2, a roller hinge 185-3, a tool bracket 185-4, a tool bracket hinge hole 185-5, a telescoping shaft hinge hole 185-6, a roller hinge bolt 185-7, a roller hinge nut 185-8, a spring hook 185-9, and a plurality of tool bracket bolts 185-10. Roller hinge 185-3 slots into tool bracket 185-4, aligning with tool bracket hinge hole 185-5, both aligning to telescoping shaft hinge hole 185-6. Roller hinge bolt 185-7 inserts through telescoping shaft hinge hole 185-6, tool bracket hinge hole 185-5, and roller hinge 185-3. Roller hinge bolt 185-7 is secured by roller hinge nut 185-8, securing roller pressure blade 185 to telescoping shaft 150. Tool bracket bolts 185-10 secures blade 165 to tool bracket 185-4. To limit roller pressure blade 185 travel beyond the desired orientation and to assist in providing the tension that holds blade 185 in place against the surface; a spring attaches to spring hook 185-9 located on wheel brace 185-2 and the back of tool bracket 185-4.

To operate the embodiment of FIG. 3B as telescoping shaft 150 extends shaft 150 provides downward pressure at the junction of roller hinge 185-3, tool bracket hinge hole 185-5, telescoping shaft hinge hole 185-6, and roller hinge bolt 185-7. To create a sharp angle for removing a surface, less downward pressure is applied to roller pressure blade 185. More downward pressure pushes wheels 185-1 further from tool bracket 185-4 and creates a shallower removal angle for blade 165. Roller pressure blade 185 is suited to curved, including sharply curved surfaces, where different removal angles are required.

FIG. 3C shows another embodiment of a removal tool 190 having several injection nozzles 190 to inject water or some other liquid underneath a surface on the substrate, and utilizing the resulting pressure to pry apart the layers of materials. In the embodiment as drawn in FIG. 3C, injection nozzle bracket 190-1 bolts to tool head 160 with a plurality of tool head bolts 170. Hose 183 couples to injection nozzle hose 190-2. Water, or some other suitable liquid, travels through hose 183 under pressure to a plurality of injection nozzle heads 190-3. Piercing heads 190-4 couple to injection nozzle head 190-3, and include a hardened tip to pierce a layer of the surface to be removed and permit the fluid ejected from nozzle heads 190-3 to penetrate underneath that layer. The pressure of the ejected liquid pushes the layer away from the substrata as it exits injection nozzle heads 190-3. Use of injection nozzles 190 facilitates the removal of a surface with minimal risk of damage to a subsurface as the removal methodology of this embodiment does not scrape against the substrata.

FIG. 3D illustrates still another tool embodiment. Particularly hard epoxies and other hard adhesives may not be easily removed by a scraping motion. In such situations, it may be desirable to use a sawing motion to remove such a surface from the substrate. FIG. 3D illustrates an oscillating scraping tool 195. Oscillating scraping tool 195 attaches to tool head 160 with a plurality of tool head bolts 170. Oscillating scraping tool 195 is further coupled to a motor or other vibrating device, to oscillate scraping tool 195 from side to side. The side to side motion allows oscillating scraping tool 195 to saw under the surface to be removed thereby detaching that surface from the substrate.

Figure 4A:
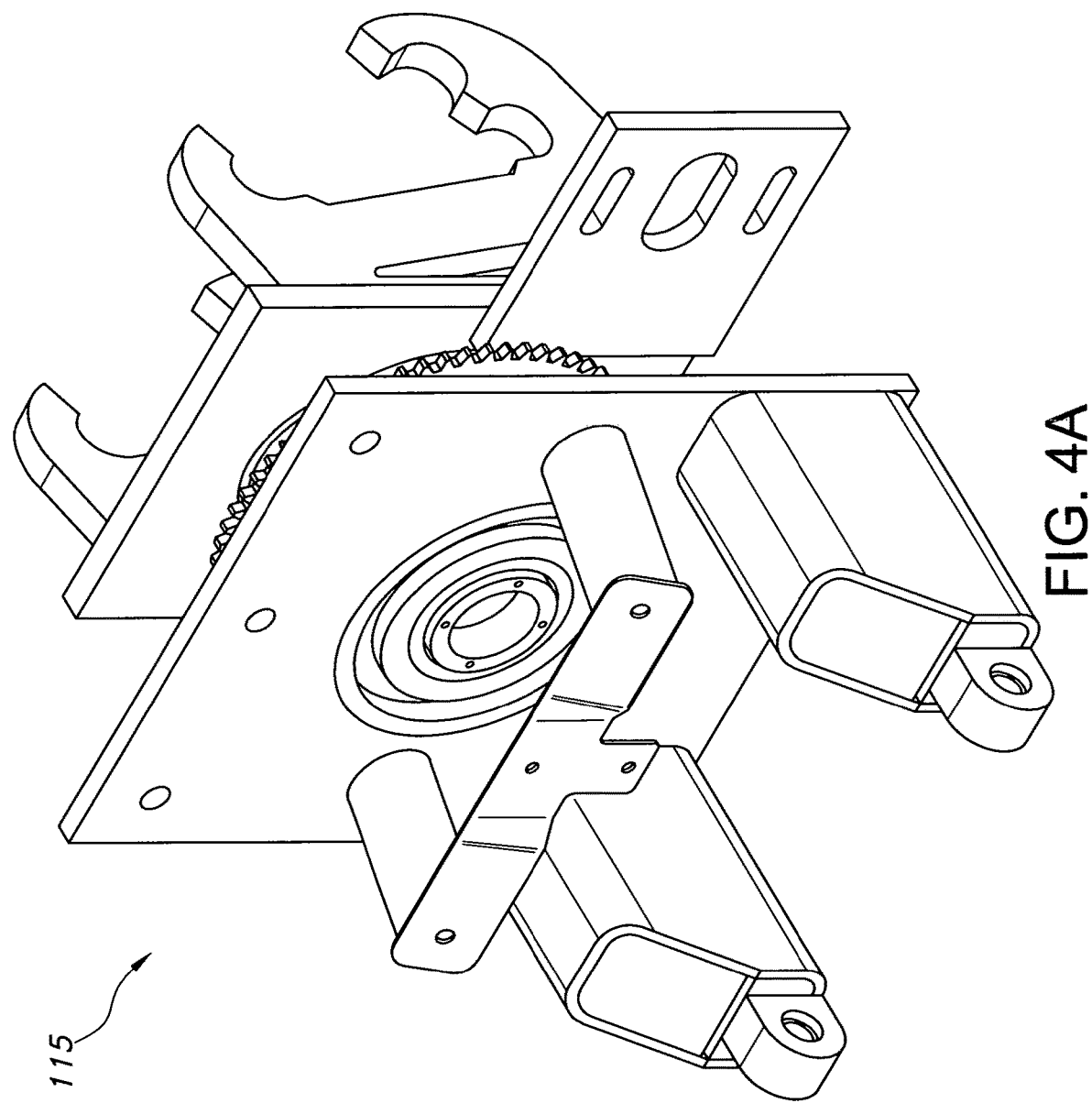

Rotator assembly 115 positions arm 150 and the attached tool along the surface substrate. FIGS. 4A-E show rotator assembly 115 in more detail. FIG. 4A illustrates the fully assembled rotator 115. FIGS. 4B-4E illustrate the subassemblies and parts that comprise the fully assembled rotator 115. FIG. 4C is a view of rotator assembly 115 from the front. FIG. 4D is a cut-away view of section A-A, showing the interior construction of spindle and gear assembly 107, standoff assembly 115-3, and hub plate 115-5. FIG. 4E is a top down view of rotating assembly 115, sans rotating spindle 115-1.

Figure 4B:
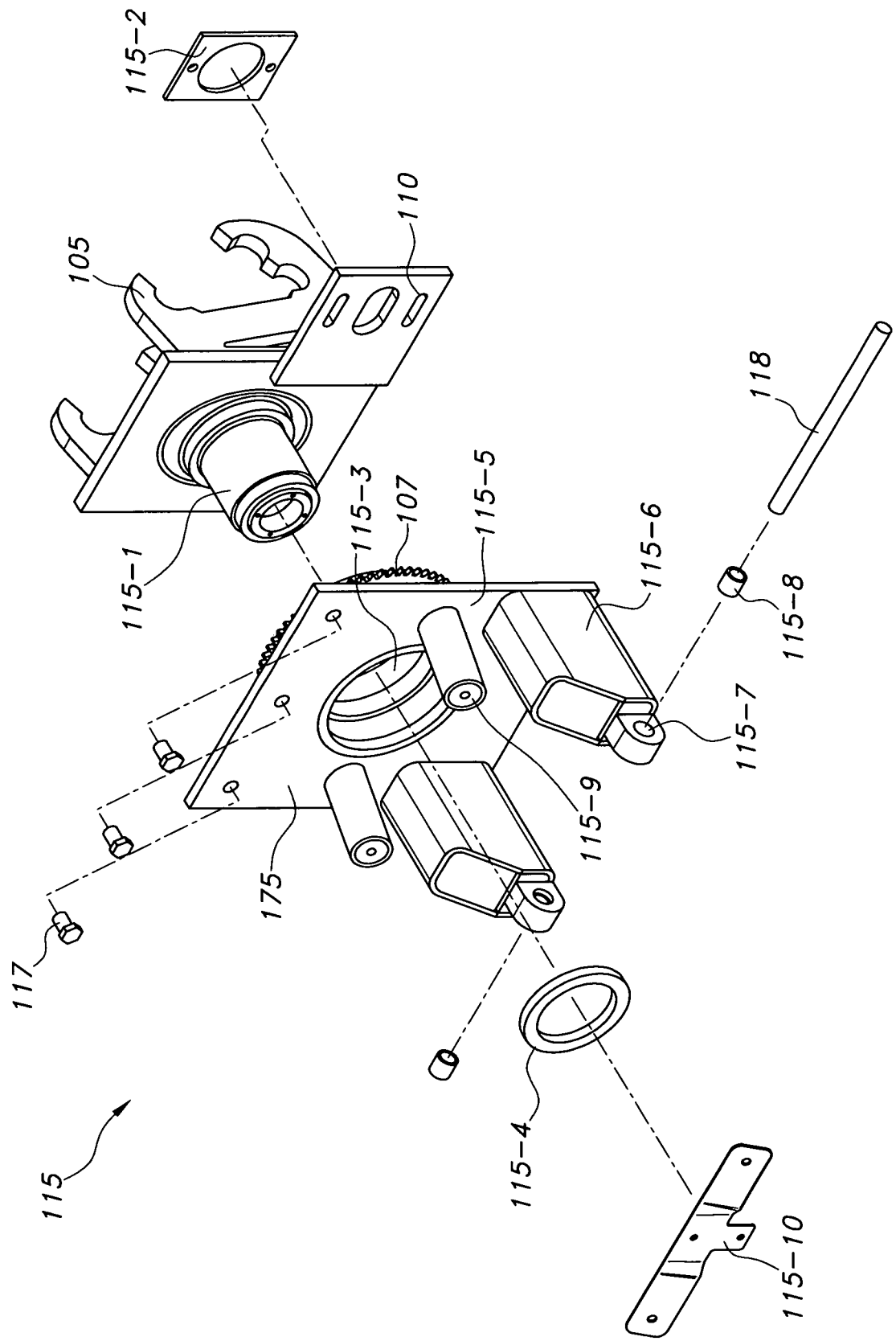
Figure 4D:
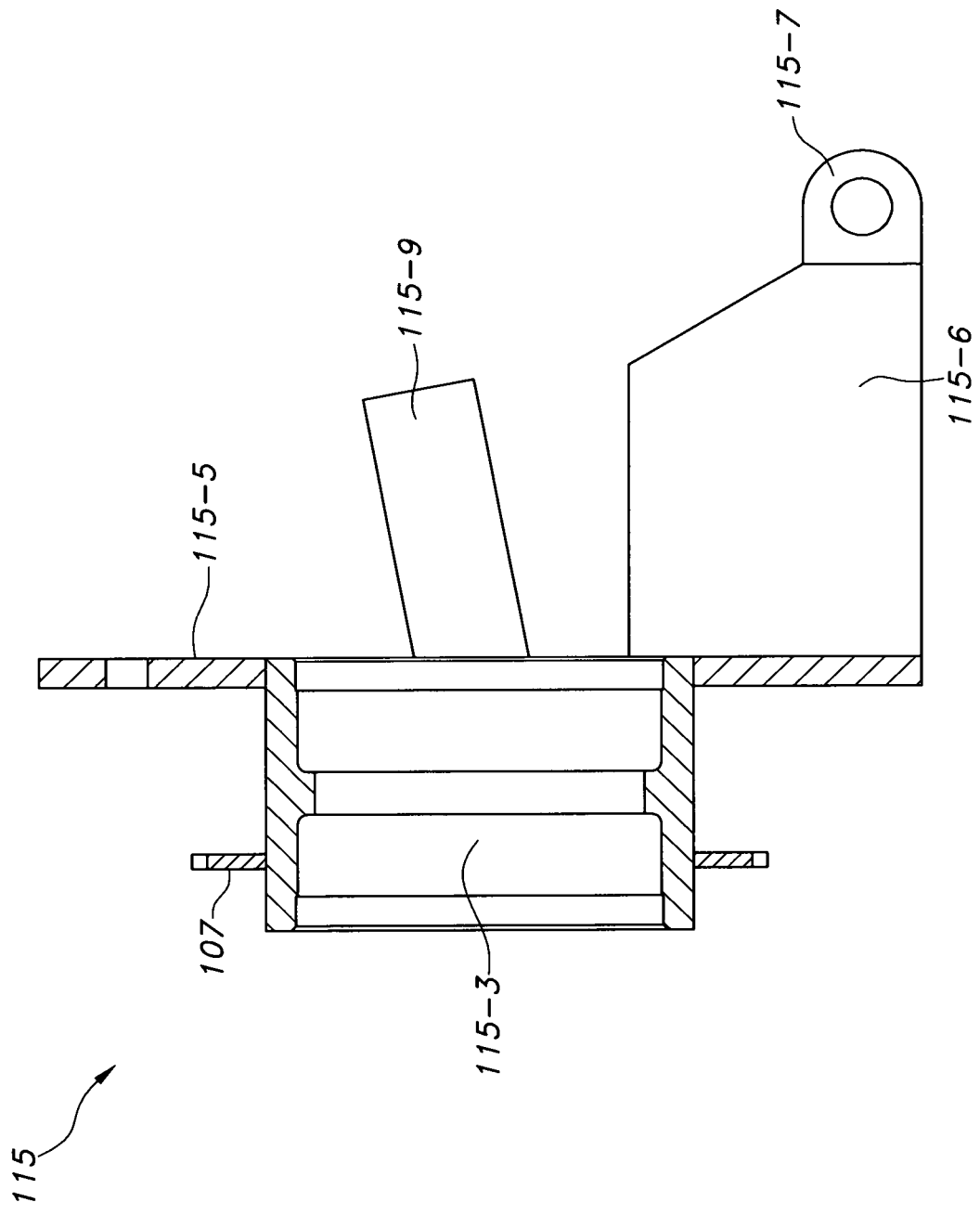

In FIG. 4B, a rotating spindle 115-1 couples to arm mount 105. Hydraulic drive mount 110 is secured to arm mount 105, for example by welding. A hydraulic drive mount back plate 115-2 secures a hydraulic drive (not shown) to the back of hydraulic drive mount 110. Hydraulic drives are well known to those of skill in the art. The hydraulic drive sends hydraulic fluid through tubing to engage a chain drive attached to spindle and gear assembly 107. The chain (not shown) drives gear 107 and spindle and gear assembly 107 turns thereby rotating spindle 115-1. Rotating spindle 115-1 is maintained in its position within standoff assembly 115-3 by spindle nut 115-4. Standoff assembly 115-3 is secured within hub plate 115-5 by spindle and gear assembly 107. As rotating spindle 115-1 spins, all of rotator assembly 115 spins. Attached to hub plate 115-5 is hub hinge tube 115-6 to which is welded hinge 115-7. Bearing 115-8 rests within hinge 115-7 and allows for free movement of hinge pin 118. Spindle post 115-9 attaches to hub plate 115-5 above hinge tube 115-6. According to one possible embodiment, base tube baseplate 120 rests against spindle post 115-9, preventing base tube baseplate 120 from moving back any further than approximately 11 degrees into rotator assembly 115. Spindle post 115-9 maybe constructed of a type of rubber material to assist in cushioning the invention as it moves backward. Anti-rotation plate 115-10 couples to spindle post 115-9. Anti-rotation plate 115-10 secures a plurality of hydraulic fluid hoses (not shown) and serves to prevent those hoses from twisting around rotator assembly 115 during operation and movement of the invention. A chain loop 175 is welded to hub plate 115-5. The functionality and use of the chain and its connection from loop 175 to base plate 120 has been previously described.

Figure 5:
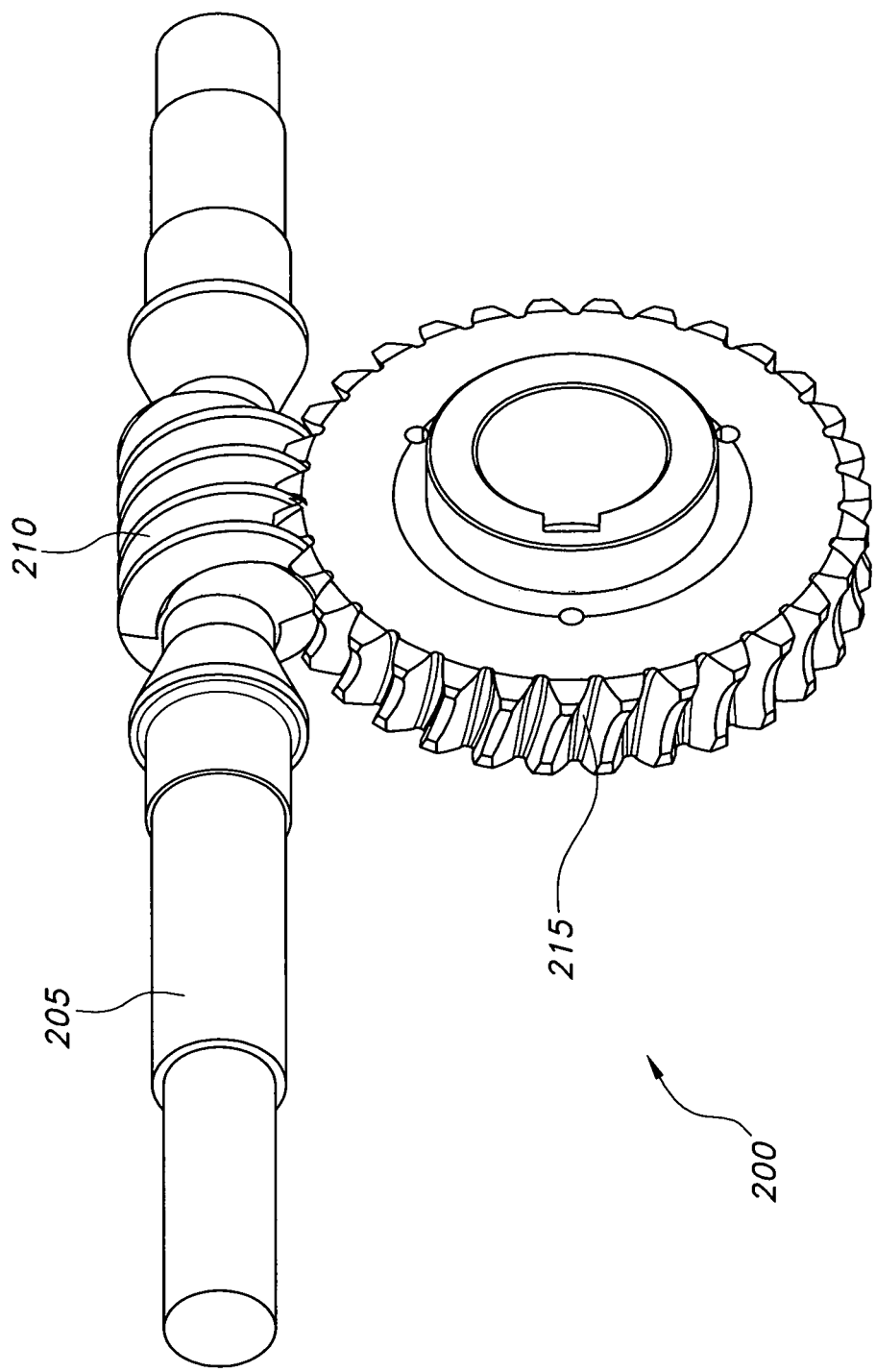
FIG. 5 shows an illustration of a worm drive according to an embodiment of the invention.

In another embodiment of the invention, the spindle and gear assembly 107 shown in FIGS. 4A-E is replaced with a worm drive 200, shown in FIG. 5. Worm drives are well known to those skilled in the art. Worm drive 200 operates by turning a wormshaft 205 to spin a worm 210. A worm is a shaft with threads carved into it that fit and run through a gear, called a worm wheel 215. Worm wheel 215 is secured to an object, such as rotator assembly 115 of the invention, and rotates such object in a clockwise or anti-clockwise direction. A commonly known example of a worm drive is the head nut pins on a guitar or a violin used to tune the strings.

Figure 6:
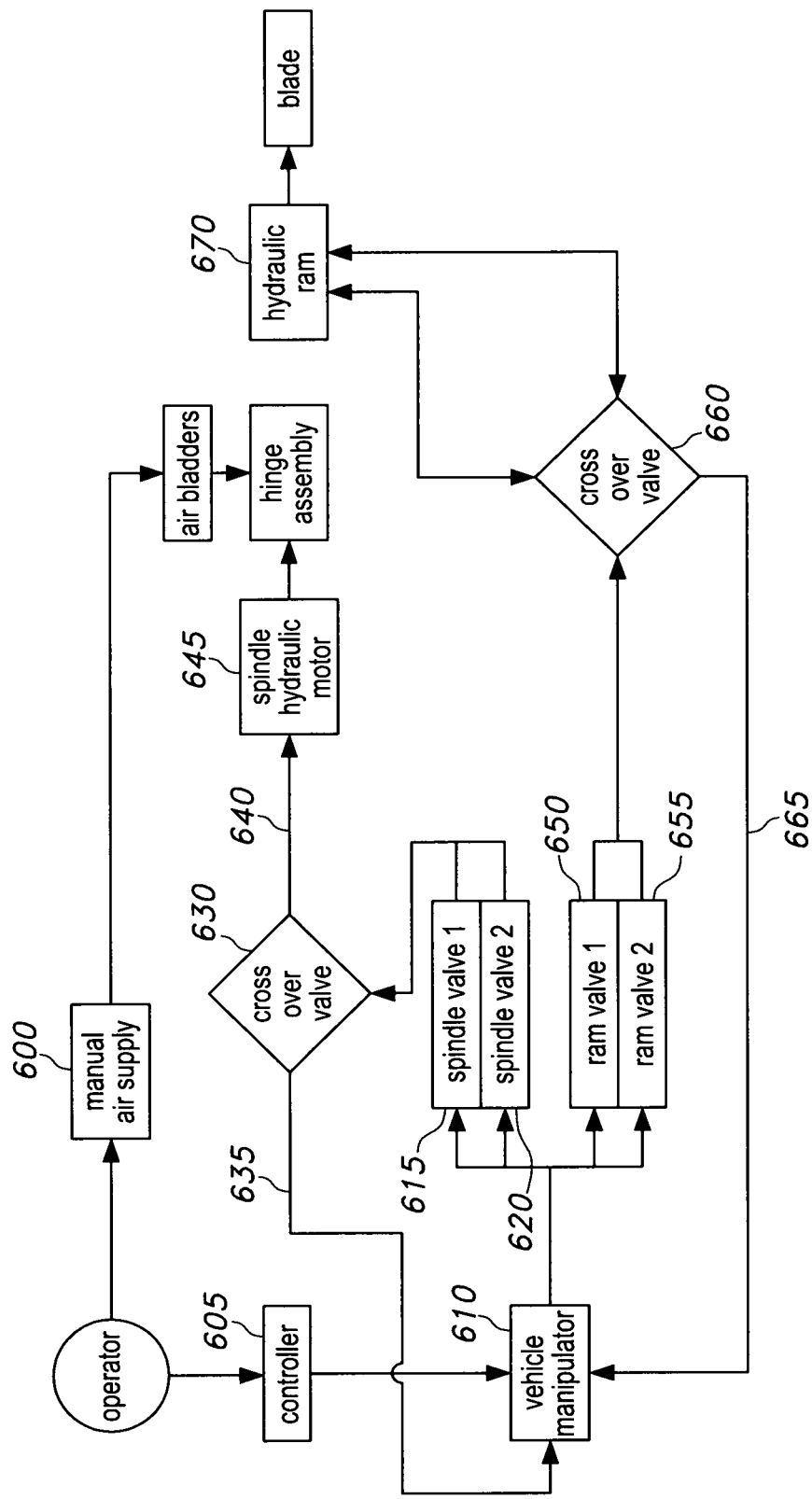
FIG. 6 is an illustration of the logic of operation according to an embodiment of the invention.

The logic of operation of the invention is illustrated in FIG. 6. In step 600 an operator first checks and sets to an appropriate range of pressure per square inch (PSI) for air bladders 116. This action can be done via a console or manually to operate the invention, a command is entered by an operator to a controller in step 605. The controller can be any input device, such as a hand-held remote control or a computer console, for example. In step 610 the input command travels to an on-board computer coupled to a manipulator device that manipulates surface removal assembly 100 as discussed in greater detail below.

In steps 615, 620 and 630, a first set of commands passes through spindle valves 1 and 2, and then through a crossover valve. A crossover valve is a safety feature commonly known to those skilled in the art. Crossover valves check the pressure of hydraulic fluid in hydraulic tubing, often referred to as lines, and ensures there is enough fluid to create an appropriate amount of pressure in the line for the commanded operation to execute. If the pressure is out of limits, that information is sent back to the vehicle manipulator on the computer for re-calibration and adjustment of the pressure in the hydraulic line as illustrated by feedback 635. If the pressure is correct, a signal 640 is sent to a hydraulic motor 645 mounted on hydraulic drive mount 110. The hydraulic motor causes rotator assembly 115 to rotate, rotating surface removal assembly 100.

A second set of commands passes from the vehicle manipulator and computer to ram valves 1 and 2 in steps 650 and 655. The signal output passes through another crossover valve in step 660 to check there is appropriate hydraulic pressure in the lines for dual acting hydraulic cylinder 140. If the pressure is incorrect, the information is sent back to the vehicle manipulator on the computer for re-calibration as shown by feedback 665. If the pressure is correct, in step 670 a signal is sent to a hydraulic motor which may be the same motor used in step 645 but now the motor extends or retract dual acting hydraulic cylinder 140 to position telescoping arm 150 fore and aft.

In operation, as hydraulic fluid is pressurized to the desired psi (pounds per square inch), rotator assembly 115 rotates to brace surface removal assembly 100 flat against a surface. A signal is sent from an onboard computer to a hydraulic motor to pressurize dual acting hydraulic cylinder 140 to extend. Dual acting hydraulic cylinder 140 extends telescoping shaft 150 and tool head 160. As telescoping shaft 150 extends, air bladders 116 provide additional pressure against base tube baseplate 120 to maintain a correct angle of contact of blade 165 against a surface for removal.

As telescoping shaft 150 and tool head 160 are extended, blade 165 scrapes against the under a layer of material to be removed. Blade 165 is of a sufficient hardness and is used to remove surface materials that may include such things as softer rubber panels and hardened epoxies in the same movement.

To reposition tool head 160, dual acting hydraulic cylinder 140 is commanded to retract, thereby retracting telescoping shaft 150, tool head 160, and blade 165. An operator repositions surface removal system 100 and sends a command to an onboard computer to extend dual acting hydraulic cylinder 140 and telescoping shaft 150 again so that surface removal work can commence on another region of the substrate.

As surface removal system 100 retracts and is repositioned, tool 100 may fall forward, causing rotator assembly 115 to open, or pivot, orienting the attached tool in an undesirable position relative to the substrate. For example, the side of the scraper blade 165 may be facing the substrate rather than the angle blade surface. Should tool 100 have some forward motion in the direction of the substrate, the blade edge might contact the substrate damaging the substrate and possibly the attached tool To prevent such undesirable tool positions, a chain secured to chain loops 175 restricts the invention from opening further than approximately 24 degrees, preventing damage to both the invention and the surface.

Figure 7:
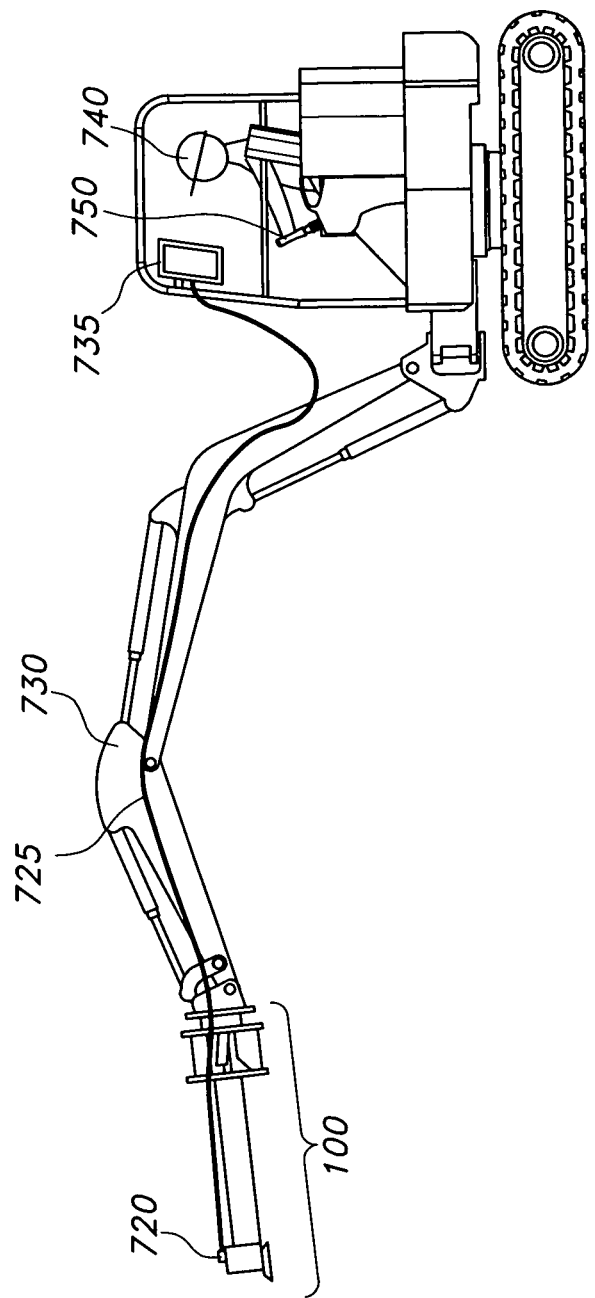
FIG. 7 shows a closed circuit television environment according to an embodiment of the invention.

FIG. 7 is an illustration of another embodiment of the invention in which a camera 720 attaches to the top of tool head 160. Camera cable 725 runs the length of surface removal system 100 and the arm 730 of the machine or vehicle to which assembly 100 is attached, to a monitor 735 forming a closed circuit TV environment. In the embodiment of FIG. 7, the human operator 740 is also shown with one or more joysticks 750 for inputting motion commands to operate arm 730 and assembly 100.

Use of a video system facilitates surface removal at elevated positions upon a vertical or curved surface; in areas of low visibility; or in hard to reach or hazardous places. Thus, a worker need not be physically located in such hard to reach or hazardous places in order to remove layers from a substrate. The invention therefore avoids exposing workers to injury when accessing such places; and also facilitates inspection of such surfaces during and after surface removal operations.

There are times in which large areas of a surface need to be removed at once; more than can be accomplished with a single tool head. Optionally, there may simply exist a desire to simply work faster by operating over large areas of a surface, rather than working in small areas and then taking the time to reposition the tool. Pivoting segmented blade 835 shown in FIG. 8 is an embodiment of the invention designed to remove large areas of a surface at one time.

In the embodiment of FIG. 8, attachment arm 840 is bolted to tool head 160 by tool head bolts 170. Large pivoting segment 845 attaches to attachment arm 840 with pivoting joint 850. Large pivoting segment 845 moves laterally in a semi-circle left or right at pivoting joint 850. Smaller pivoting segment 855 attaches to the front ends of large pivoting segment 845 with a plurality of pivoting joints 850. Smaller pivoting segment 855 moves in the same motion as large pivoting segment 845, but with a smaller area of coverage in the semi-circle. Each end of smaller pivoting segment 855 attaches to tool plate 860. Blade 165 secures to tool plate 860 with tool plate bolts 865. As pivoting segment blade 835 moves across a surface, pivoting joints 850 allow large pivoting segment 845 and small pivoting segment 855 to move laterally left and right, adjusting to the surface and direction of hydraulic push. The tool attachments described in FIGS. 3A-E may be also secured to tool plate 860 in multiples of individual tools or in combination with other tools.

The subject matter defined in the appended claims is not necessarily limited to the specific features or acts described above. Rather, the specific features and acts are disclosed as example forms of implementing the claims. Many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A robotic machine for removing a layer from a substrate, comprising:
    a surface removal tool;
    a manipulator arm having a first end coupled to the surface removal tool, wherein the manipulator arm positions the surface removal tool at a location along the substrate;
    a rotation assembly coupled to a second end of the manipulator arm for adjusting an angular position of the surface removal tool, wherein the rotation assembly comprises a spindle, wherein the spindle is adapted to rotate, the spindle held by a spindle nut within a hub plate of the rotation assembly;
    a hinge pin attached to the rotation assembly via a hinge of the hub plate, the hinge pin further attached to a base plate; and,
    one or more air bladders coupled to the hub plate and the base plate, the air bladders biasing the base plate such that the surface removal tool is maintained at a set angle of contact.

2. The robotic machine of claim 1, wherein the surface removal tool further comprises a blade.

3. The robotic machine of claim 1 wherein said surface removal tool further comprises a pressure roller for positioning said surface removal tool along a curved substrate.

4. The robotic machine of claim 1 wherein said surface removal tool further comprises a brush.

5. The robotic machine of claim 1, wherein the surface removal tool further comprises a plurality of surface removal tools and an attachment arm having a plurality of attachment points for attaching the plurality of surface removal tools.

6. The robotic machine of claim 5, wherein the plurality of surface removal tools further comprises a plurality of different types of surface removal tools.

7. The robotic machine of claim 1, further comprising:
    a device to limit a degree of the angular rotation.

8. The robotic machine of claim 1, further comprising:
    a mechanism to extend and retract the manipulator arm.

9. The robotic machine of claim 8, wherein the mechanism comprises a hydraulic system.

10. The robotic machine of claim 1, further comprising:
    a hose coupled to at least one of said surface removal tool and said manipulator arm for applying a fluid to a surface of the substrate.

11. The robotic machine of claim 1, further comprising:
    a camera.

12. The robotic machine of claim 11, wherein the camera is positioned to obtain a view of the substrate in a vicinity of the surface removal tool.

13. The robotic machine of claim 11, further comprising:
    a user interface coupled to receive a signal from the camera and coupled to receive a command from an operator of the robotic machine.

14. The robotic machine of claim 1, further comprising:
    a user interface coupled to receive a command from an operator of the robotic machine and coupled to the robotic machine, wherein the robotic machine positions the surface removal tool in response to the command.

15. The robotic machine of claim 14, wherein the user interface further comprises a joystick.

\* \* \* \* \*